United States Patent
Dang et al.

(10) Patent No.: US 10,769,532 B2
(45) Date of Patent: Sep. 8, 2020

(54) NETWORK RATING PREDICTION ENGINE

(71) Applicant: Accenture Global Solutions Limited, Dublin (IE)

(72) Inventors: Congwei Dang, Tokyo (JP); Takuya Kudo, Kirkland, WA (US); Takafumi Mizuno, Tokyo (JP); Makoto Yomosa, Tokyo (JP); Sayaka Tanaka, Tokyo (JP); Miku Yoshio, Tokyo (JP)

(73) Assignee: Accenture Global Solutions Limited, Dublin (IE)

( * ) Notice: Subject to any disclaimer, the term of this patent is extended or adjusted under 35 U.S.C. 154(b) by 759 days.

(21) Appl. No.: 15/480,011

(22) Filed: Apr. 5, 2017

(65) Prior Publication Data
US 2018/0293488 A1    Oct. 11, 2018

(51) Int. Cl.
*G06N 3/08* (2006.01)
*G06N 3/04* (2006.01)
*G06F 40/30* (2020.01)

(52) U.S. Cl.
CPC .......... *G06N 3/088* (2013.01); *G06N 3/0454* (2013.01); *G06N 3/082* (2013.01); *G06F 40/30* (2020.01)

(58) Field of Classification Search
USPC ........................................................ 706/25
See application file for complete search history.

(56) References Cited

U.S. PATENT DOCUMENTS

| | | | | |
|---|---|---|---|---|
| 9,524,450 | B2 * | 12/2016 | Ravindran | G06K 9/00 |
| 9,940,386 | B2 * | 4/2018 | Kudo | G06F 16/258 |
| 10,289,641 | B2 * | 5/2019 | Kudo | G06F 16/334 |
| 10,424,006 | B2 * | 9/2019 | Fujita | G06Q 30/0635 |
| 2016/0048872 | A1 * | 2/2016 | Sanchez | G06Q 30/0255 705/14.53 |
| 2019/0378193 | A1 * | 12/2019 | Sen | G06F 15/76 |

OTHER PUBLICATIONS

JP Office Action in Japanese Application No. 2018-071414, dated Jul. 17, 2019, 9 pages (with English translation).
Okanohara, "Practical Techniques for Large-scale Deep Learning" The Japan Society for Artificial Intelligence, Sep. 1, 2013, 28(5): 785-792.
(Continued)

*Primary Examiner* — Michael B Holmes
(74) *Attorney, Agent, or Firm* — Fish & Richardson P.C.

(57) ABSTRACT

A rating prediction engine builds and applies models to predict ratings based on an analysis of textual reviews and comments. The engine can build multiple models simultaneously through distributed parallel model building that employs deep convolutional neural networks (CNNs). The engine can also incorporate user moment feature data, including user status and context information, to provide better performance and more accurate predictions. The engine can also employ heuristic unsupervised pre-training and/or adaptive over-fitting reduction for model building. In some instances, the techniques described herein can be used in a service to predict personalized ratings for reviews or other published items, in instances where the original author of the item did not include a rating and/or in instances where the publication channel does not provide a mechanism to enter ratings.

17 Claims, 14 Drawing Sheets

(56) References Cited

OTHER PUBLICATIONS

Otsuka et al., "Evaluation Score Prediction for Respective Customer Reviews Focusing on Word Distributed Word Representation and Grammatical Representation", DEIM Forum 2017, Feb. 27, 2017.
Shindo et al., "Analysis of Multiword Expression using Convolutional Neural Network" The Information Processing Society of Japan, Sep. 20, 2015, 2015-NL-223, pp. 1-7.
Toyama et al. "Rating Prediction by Considering Relations among Documents and Sentences and among Categories" Toyota Technological Institute, 2016, pp. 158-161.
Ueda et al., "Low Latency Data Stream Processing on Multi-Core CPU Environments", The Institute of Electronics, Information, and Communication Engineering, Mar. 1, 2013, J96-D(5): 1094-1104.

\* cited by examiner

NETWORK RATING PREDICTION ENGINE

BACKGROUND

Individuals publish information online to describe their travel experiences, review purchases of goods or services, review media content, describe sites they have visited, and so forth. Such information may be published on social media, service review sites, e-commerce applications, and/or other channels. Organizations may retrieve the published information from various publicly available channels, and analyze the information to identify trends or patterns, or for other purposes. Given the increasing amount of information published online by individuals, retrieval and analysis of the published information may pose challenges with respect to scalability, developing confidence in the accuracy or completeness of the published information, and/or developing confidence that the information has been posted by individuals who are not automated processes (e.g., bots) and who are objective (e.g., not affiliated with the product or service that is the subject of their published information).

SUMMARY

Implementations of the present disclosure are generally directed to rating prediction for reviews and/or other information published online. More specifically, implementations are directed to an engine that employs deep convolutional neural network (CNN) models to predict ratings for published items.

In general, innovative aspects of the subject matter described in this specification can be embodied in methods that include actions of: receiving first review data that includes a plurality of rated reviews; determining a plurality of model building transactions to be executed to build at least one prediction model based on the first review data; building the at least one prediction model through use of at least one deep convolutional neural network (CNN), including distributing the plurality of model building transactions for parallel execution on a plurality of compute nodes; receiving second review data that includes a plurality of unrated reviews; and predicting a rating for each of the plurality of unrated reviews using the at least one prediction model.

Implementations can optionally include one or more of the following features: the plurality of model building transactions are distributed, through a scheduler, based on load information for the plurality of compute nodes; the load information is received by the scheduler from a plurality of training managers each executing on a respective compute node; the building of the at least one prediction model includes a heuristic unsupervised pre-training that employs a heuristic formula that includes an absolute difference factor and a distribution difference factor; the building of the at least one prediction model includes a user moment feature fusion to provide a plurality of unified features by combining a plurality of user moment features with a plurality of features that are output from the at least one deep CNN; the building of the at least one prediction model includes an adaptive over-fitting reduction to reduce the plurality of unified features; the adaptive over-fitting reduction includes, in one or more iterations, randomly dropping out a subset of the unified features, and determining a strength parameter based on a difference between outputs of a training iteration applied to training data and validation data, wherein the strength parameter indicates an amount of random dropout in a next iteration; the at least one deep CNN includes a plurality of convolution layers of varying scope; and/or the plurality of convolution layers includes layers that correspond to a phrase feature map group, a sentence feature map group, a paragraph feature map group, and a context feature map group.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available systems. Through distributed parallel model building, in which the model building process is divided into multiple dispatchable transactions that are dispatched for parallel execute on multiple compute nodes (e.g., CPUs and/or GPUs), implementations provide model building that is faster and more efficient than previously available model building solutions. A scheduler may balance the load of dispatchable transactions among a set of available compute nodes, thus ensuring that each node is used efficiently. Thus, implementations make more efficient use of processing capacity, active memory, and/or other computing resources compared to previously available systems that apply traditional model building techniques. Moreover, through use of user moment fusion, adaptive over-fitting reduction, and heuristic unsupervised pre-training, implementations produce prediction models that provide more accurate predictions compared to traditionally built models.

In some implementations, the distributed parallel model building described herein employs a model building transaction protocol. The protocol supports network communication between a central training scheduler and local training managers. It divides one model building task into multiple dispatchable transactions that can be shared among multiple compute nodes, as described above. This distributed parallel model building provides various advantages over previously available techniques. For example, heterogeneous compute nodes, which are based on CPU and/or GPU architectures, may run on different operating systems and/or use different machine learning packages, and can be simultaneously managed by applying this protocol. This provides for high scalability and avoids substantial configuration efforts for large scale model building work.

In some implementations, fine management granularity is provided. As described above, the granularity provides that the entire model building process can be divided into multiple (e.g., more fine-grained) model building transactions. This provides manageable features for progress monitoring, and task progress backup and restore, which are particularly useful for large scale model building tasks.

Implementations support various types of machine learning usage, and supports any suitable type of deep machine learning, including deep learning and other conventional machine learning tasks such as Support Vector Machine (SVM), Random Forest, Logistic Regression, and so forth. Implementations may be used for model building for any appropriate type of applications.

In some implementations, the distributed parallel model building employs a parallel model building framework. Based on the model building transaction protocol, a parallel model building framework is employed to support distributed computation. This provides various technical benefits compared to previously available solutions, including benefits for scalability. The time needed for model building can be shortened by increasing the number of nodes. Such a feature is particularly useful for large scale model building tasks, especially those with real time requirements. The distributed model building framework also provides better robustness than single task. If one node fails, the task can be recovered at other node(s). This is particularly useful for critical model building tasks. The model states, such as model internal variables, learning scheme, and/or hyper parameters, are serialized and stored during the learning process at transaction level, so that the tasks can be fast recovered when failures occur. Implementations also provide real-time resource optimization. Because the model building transactions are managed at the mini-batch level, the computation tasks can be scheduled with a frequency of one or several seconds. This enables real-time optimization of computation resources. This is particularly useful for reuse of existing computation resources shared with other computational services, given that the tasks can be quickly shifted among nodes according to ad hoc task loads.

In some implementations, the distributed parallel model building also supports multiple learning schemes. For example, one or more applicable deep learning schemes, such as constant learning rate, momentum learning scheme, Nesterov accelerated gradient, Adagrad, Adadelta, and/or others, may be combined and managed by the local Training Manager. The Training Manager can tune the learning configuration parameters to balance model validation performance and training time spent. This provides various technical benefits over previously available solutions, through best scheme selection. Because multiple applicable deep learning schemes are integrated into the engine, the appropriate scheme may be readily selected and used for specific model building tasks. Implementations support various Machine Learning Usages, related to deep learning tasks, including deep CNN, and other types of model architectures such as denoising autoencoders, Recursive neural networks, Restricted Boltzmann Machines, and so forth.

In some implementations, heuristic unsupervised pre-training is employed, as described above. This may include applying a heuristic formula for unsupervised pre-training. The formula can define the cost calculation for unsupervised pre-training. The formula also enables automatic processing for general purpose of deep CNN model building, based on both absolute difference and distribution difference. Through use of such a formula, unsupervised pre-training can be performed without considering the specific characteristics of the dataset. The hyper-parameters of the formula enable fine tuning to improve the performance of the outcome. Such unsupervised pre-training may be applied to various deep CNN tasks, and may be used for model building in various applications.

In some implementations, user moment feature fusion is employed, as described above. User moment feature fusion may apply user status context that is relevant to purchase stage, behavioral time, and/or activity types captured by using moment features, which are fused into the model building to improve the model performance. User moment fusion provides performance improvement with the capture of moment features. For example, factors that can influence the user decision process of ratings and/or purchases may be better captured through user moment feature fusion compared to traditional solutions, and the model performance may therefore be improved. User moment feature fusion also provides for better targeting with moment identification. The validation accuracy determines which moments are more important to a particular decision, and the moments that give more contributions to model performance may be those that are more important, and therefore should be given more consideration. There may be a strong correlation between the moment(s) of interest and the expected outcomes. User moment feature fusion may be used in various machine learning systems related to deep learning tasks, and may also be extended to other machine learning methods with some implementation modifications. User moment feature fusion may be used for model building with various applications.

In some implementations, adaptive over-fitting reduction is employed, as described above. An over-fitting measurement formula quantitatively measures the level of over-fitting by investigating the difference between training and validation performance. The over-fitting reduction provides a quantitative definition of an indicator that measures the over-fitting level, without requiring particular domain knowledge for the input data. This provides the basis of evaluation and improvement of over-fitting reduction. The adaptive dropout strength formula and automatic adjustment, as described above, adjusts the strength of dropout continuously by checking the indicator of the training-validation difference. Over-fitting reduction provides an automatic process of over-fitting reduction without the necessity of specific domain knowledge, may be employed in various types of deep CNN tasks, and may be applied to model building for various types of applications.

Some implementations also employ multiple feature-map groups, of different sizes, in a deep CNN model. This provides an enhanced learning ability, such that the learning ability of the model is enhanced to capture the text features at phrase level, sentence level, paragraph level, context level, and/or other levels, as described above. Such feature-map groups may be applied to various deep CNN tasks, and for model building for text and/or image data.

Some implementations also employ variable-sized runtime convolution operations. Such a modified convolution operation can support variable sizes of input data at runtime. This provides runtime support for variable length of input data. For example, a length limit of runtime input data, which is typically imposed by conventional convolution operations, is removed. Such variable-sized runtime convolution operations may be applied to various deep CNN tasks, for model building for text and/or image data.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to a rating prediction engine that builds and applies models to predict ratings from textual reviews and comments. The engine can build multiple fine-targeted models for multiple (e.g., market) segments simultaneously, through distributed parallel model building that employs deep convolutional neural networks (CNNs). The engine can also incorporate user status and context information to provide better performance and more accurate predictions, compared to traditional methods for building models. In some instances, the techniques described herein can be used in a recommendation service to predict personalized ratings for reviews or other published items, in instances where the original author of the item did not include a rating and/or in instances where the publication channel does not provide a mechanism to enter ratings. The techniques described herein can be used in operation optimization service to predict service level satisfaction. The techniques can also be used in inbound strategy service to assess tourism resource and infrastructures, and/or in other suitable usage scenarios.

Figure 1:
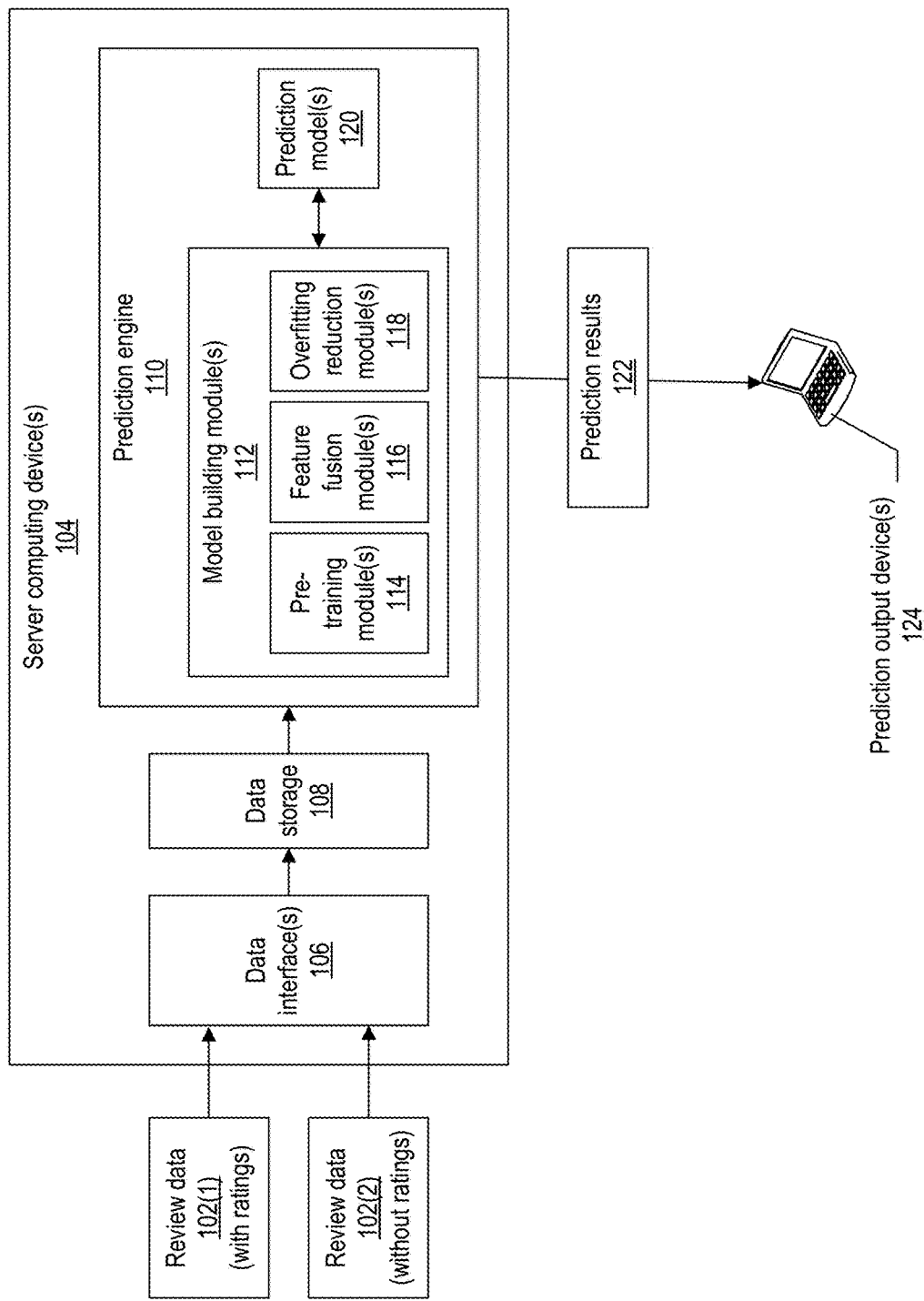
FIG. 1 depicts an example system and engine for network rating prediction, according to implementations of the present disclosure.

FIG. 1 depicts an example system and engine for network rating prediction, according to implementations of the present disclosure. As shown in the example of FIG. 1, the system may include one or more server computing device(s) 104 of any suitable number and type of computing device. The server computing device(s) 104 execute a prediction engine 110 and one or more data interfaces 106. The server computing device(s) 104 can also include data storage 108 of any suitable type. In some implementations, the data storage 108 may be external to the server computing device(s) 104, and accessible over one or more networks.

The data interface(s) 106 may receive review data 102(1) and review data 102(2). Each set of review data may include any appropriate number of published reviews that have been posted to social networks, review sites, e-commerce sites, and/or other public channels. For example, individuals may write and post reviews for restaurants where they have eaten, tourist landmarks they have visited, and/or other locations. Each review may include any suitable amount of data that includes text data. The review data 102(1) includes reviews that have been posted with an associated rating, such as a rating of one to five stars to provide a quantitative measure of the author's experience at the location being reviewed. The review data 102(2) includes reviews that have been posted without an associated rating. In such instances, the author may have omitted the rating and/or the site where the review is posted may not support the posting of numeric or other types of ratings. The review data 102(1) and 102(2) may also include other information and/or metadata associated with the posted reviews, such as user profile data for the author, purchase data describes products and/or services purchased by the author, location information (e.g., geo-tags) describing the geographic location of the author who posted the review, and so forth.

The review data 102(1) and 102(2) may be received by the data interface(s) 106, which store the review data 102(1) and 102(2) in the data storage 108. The data interface(s) 106 support various methods for receiving the review data, including pulling the reviews from the channels where they were published, searching the channels for reviews, and/or review a (e.g., live, real-time) feed and/or stream of review data from the publication channel(s). The data storage 108 may be any suitable type of data storage, such as a cloud service, data warehouse, distributed big data platform, relational and/or non-relational databases, and so forth. The prediction engine 110 may retrieve the review data 102(1) and the review data 102(2) from the data storage 108. Alternatively, the prediction engine 110 may receive the review data 102(1) and/or the review data 102(2) from the data interface(s) 106 without intermediate storage of the data in the data storage 108.

The prediction engine 110 may build one or more prediction models 120, and use the prediction model(s) 120 to generate prediction results 122. The prediction results 122 may be stored on the server computing device(s) 104, and/or elsewhere, and may be transmitted to one or more prediction output devices 124 for display and use by data consumers, such as marketing professionals. The prediction results 122 may include, for each of the reviews in the review data 102(2), a prediction of the rating that the author may have included had they included a rating and/or had the publication channel supports the provision of ratings with the posted reviews. Accordingly, the prediction results 122 provide, for each previously unrated review, a predicted rating that is a quantitative measure of the review author's level of satisfaction, or dissatisfaction, with the location being reviewed.

Implementations provide for a prediction engine 110 that builds the prediction models 120 through distributed parallel model building, using deep learning that employs CNNs. With respect to distributed parallel model building, implementations provide a framework to build large scale models in parallel using deep learning technology. In some implementations, the prediction engine 110 further employs heuristic unsupervised pre-training, user moment feature fusion, and/or adaptive over-fitting reduction to generate the model(s) 120. To apply such features, the prediction engine 110 includes model building modules 112 such as pre-training module(s) 114, feature fusion module(s) 116, and/or over-fitting reduction module(s) 118. Heuristic unsupervised pre-training is used in the deep learning techniques to increase accuracy of the model. Implementations employ a heuristic method to guide this process to increase efficiency in training process compared to traditional techniques. User moment feature fusion leverages certain customized feature(s) (e.g., in the digital marketing context). As used herein, a user moment is a characteristic or attribute of an individual that is related to their behavior online, such as their search habits, products or topics they have expressed an interest in, and so forth. Adaptive over-fitting reduction provides an automatic tuning mechanism to balance performance versus accuracy in the model building process. Each of these aspects—distributed parallel model building, heuristic unsupervised pre-training, user moment feature fusion, and adaptive over-fitting reduction—is described further below in more detail.

Traditionally, deep learning techniques have focused on classification. The implementations described herein extend the use of deep learning to regression techniques. By developing large-scale models in parallel, implementations reduce the amount of time needed to build the models and provide for models that generate more accurate predictions, compared to traditional model generation techniques.

The predicted ratings may be provided in a variety of situations to a variety of data consumers. For example, the predicted ratings may be provided to marketing organizations or other entities that seek to generate personalized recommendations for individuals. The predicted ratings may enable more accurate and/or more deeply personalized recommendations to be generated for individuals, with respect to goods and/or services to be offered, travel destinations to be suggested, suggested media consumption options, suggested locations to visit, and so forth. As another example, the predicted ratings may be provided to business owners and/or other service providers, to enable such entities to more accurately determine customer satisfaction levels. As another example, the predicted ratings may be provided to public sector entities for use in resource and/or infrastructure assessment and/or improvement projects. Implementations support other appropriate use cases as well.

In an example use case, the rating prediction may be used to evaluate and/or develop an advertising campaign. For example, a first set of reviews in review data 102(1) may be posted with ratings provided by the posting individuals, such reviews posted in response to a particular advertising campaign. The ratings may be retrieved for the posted reviews and used, along with the text of the reviews, to train the predictive model(s). In some implementations, the predictive model(s) are trained using offline data, including past similar reviews with ratings, from the same or different channels (e.g., social networks, e-commerce sites, review sites, etc.). When new posted reviews along with ratings are available, the model(s) may be further incrementally trained with such online data. The model(s) may be applied to the second set of reviews in the review data 102(2), where such reviews were not originally posted with associated ratings, to predict the ratings that may have been included. The predicted ratings for the review data 102(2) can be used, in some instances with the ratings for the review data 102(1), to evaluate a previous or current marketing campaign, inform the determination of a new marketing campaign, and/or for other purposes.

Figure 2:
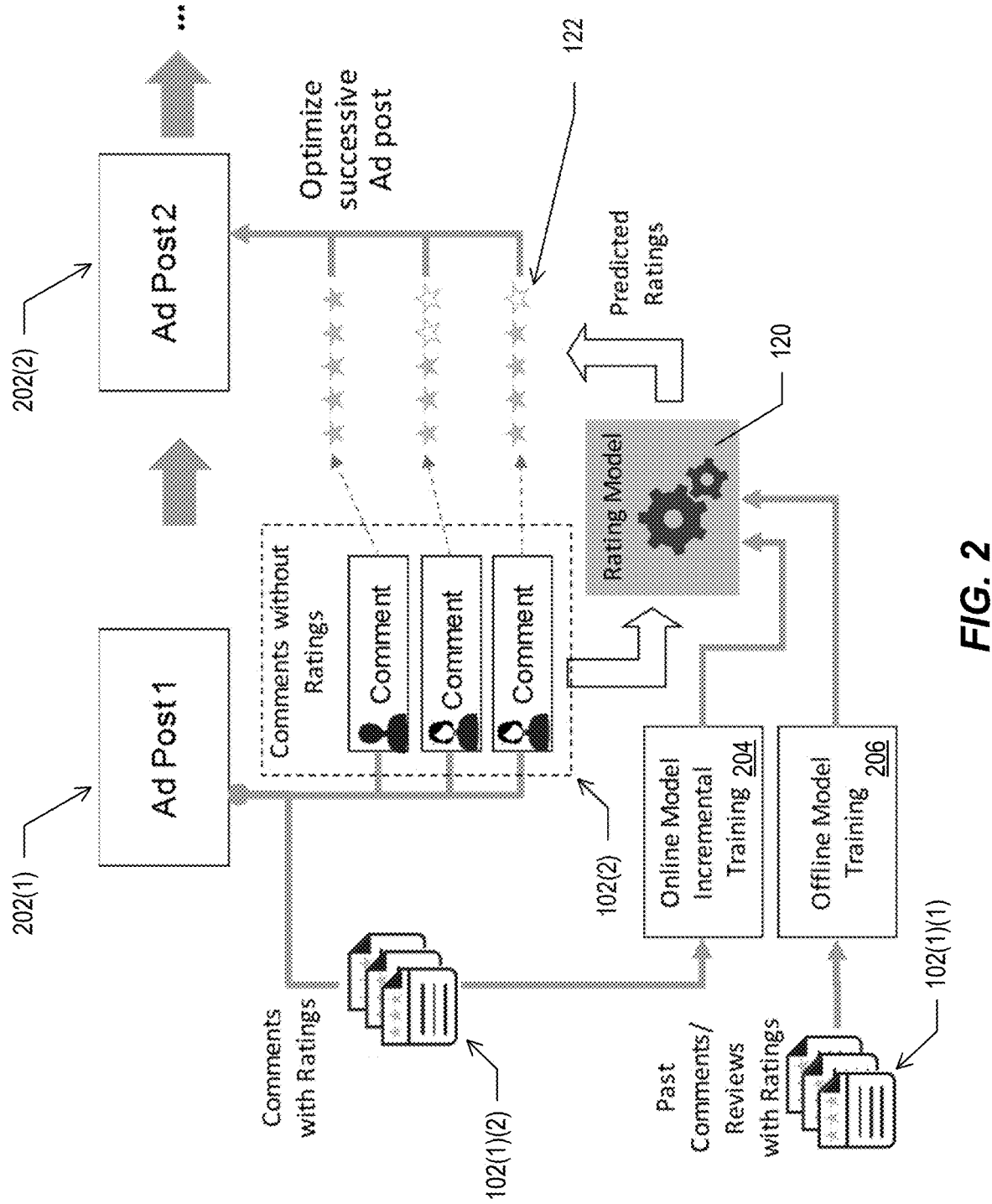
FIG. 2 depicts a schematic of an example application of rating prediction, according to implementations of the present disclosure.

FIG. 2 depicts a schematic of an example application of rating prediction, according to implementations of the present disclosure. Ratings posted with reviews 102(1) may be used to train one or more models 120. The model(s) 120 may be employed to predict ratings 122 for posted reviews 102(2) that are not initially associated with ratings. In the example shown, the previously unrated reviews 102(2) are posted as comments in response to a first advertisement 202(1). The predicted ratings 122 may be employed to determine one or more subsequent advertisements 202(2).

In some implementations, as shown in FIG. 2, the predictive model(s) 120 are initially trained through offline model training 206, using offline data 102(1)(1) that includes past similar reviews with ratings, from the same or different channels (e.g., social networks, e-commerce sites, review sites, etc.). The initial model(s) 120 may be used to predict ratings 122 are described above. When new posted reviews, or other types of rated data 102(1)(2) become available (e.g., as online data), such information may be used in online model incremental training 204 to incrementally train (e.g., update) the model(s) 120. Such updating may refine the model(s) 120 such that the model(s) provide more accurate predictions. Implementations support any suitable number of iterations in which the model(s) 120 are incrementally updated based on available data 102(1)(2) with ratings.

In some examples the rating prediction can be used in interactive applications such as campaign optimization. A campaign session may include a series of advertisement (e.g., ad) posts. The models may be used to predict quantitative ratings from the various users' comments and/or other reviews. The predicted ratings may then be used to adjust the successive ad post to optimize the promotion effect in a fast pace and/or in real time. The rating prediction described herein may also be used in other scenarios or environments that are not related to advertising or marketing.

The ratings prediction may provide various advantages compared to previously available solutions. In marketing, business management, policy making, and/or other contexts, user (e.g., consumer) ratings are valuable data and usually more scarce and expensive compared to generally available review data without rating information included. Implementations enable the conversion of (e.g., big data) reviews into rating information, which provides added value to organizations seeking to quantify their levels of service. Using the predicted ratings, inbound marketers can get fine-segmented customer preference information that is transformed from the previously unrated review data, to be used to recommend better market strategy that may cover even niche inbound market segments. Inbound business owners and service providers can monitor customer satisfaction levels (e.g., in real time) by aggregating the individual ratings, so that they can improve their business process in a faster pace. Tourism agencies of governments and public organizations can be provided with further aggregated ratings in order to assess tourism resources and infrastructure environments. Such rating prediction information may be used in inbound policy making or other settings. Digital marketers can timely get quantitative effect measurements of the ad posts, which are predicted by applying the models to user comments that are published in response to (e.g., below) the posts. Such measurements can be used to optimize the campaign.

The models built by the prediction engine can be used to predict the ratings of the ad post from users' comments. The predicted ratings can then be used to guide the optimization process of the successive ad post, which may then be analyzed through ratings prediction to optimize the subsequent ad post, and so on for any suitable number of iterations. The approach can also be combined with A/B testing, so that the effects are measured quickly in response to published user comments in response to an ad.

Figure 3:
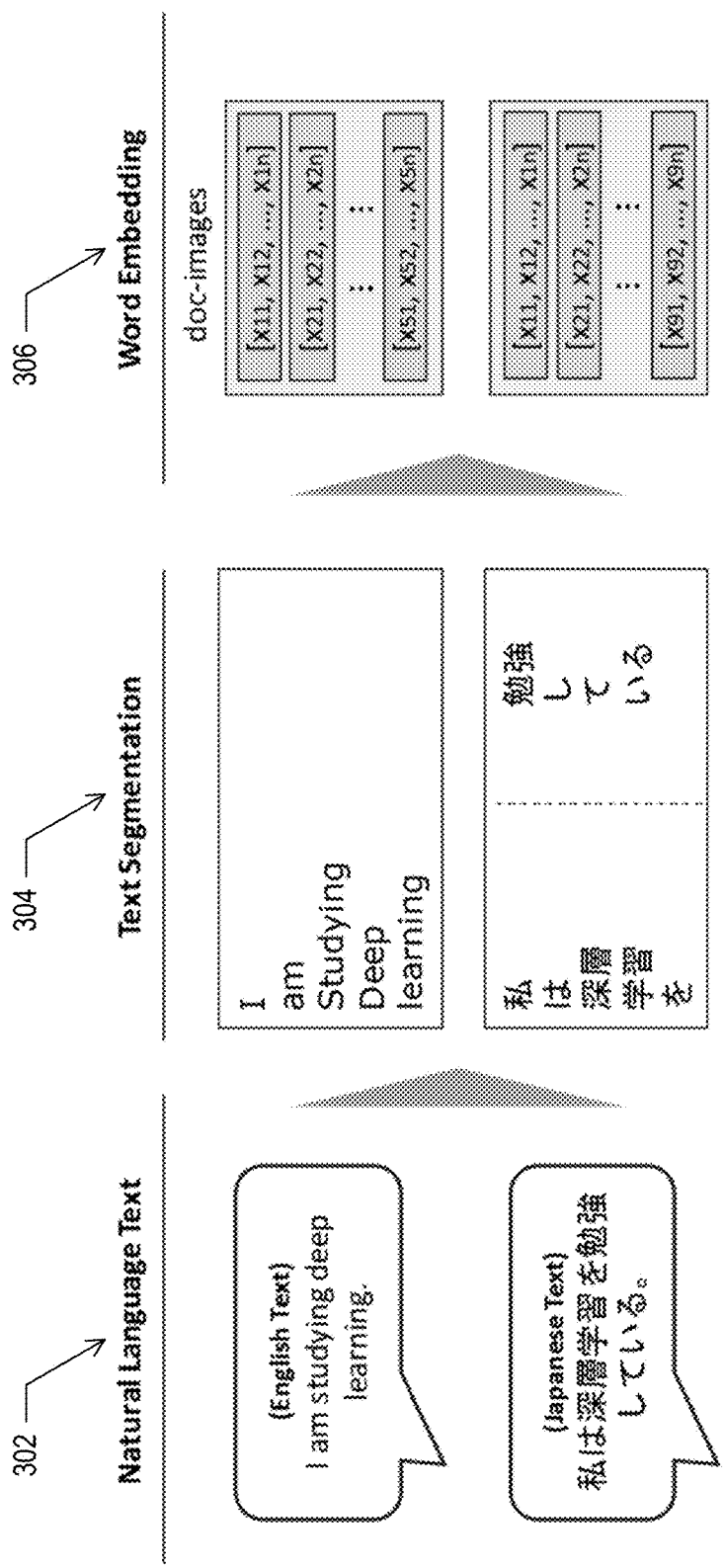
FIG. 3 depicts a schematic of example language processing that may be employed in rating prediction, according to implementations of the present disclosure.

FIG. 3 depicts a schematic of example language processing that may be employed in rating prediction, according to implementations of the present disclosure. In some implementations, the prediction engine 110 employs language-specific tokenization and/or word embedding as a preliminary step prior to using the input review data to train the model(s). The input natural language text 302 of each of the reviews may be analyzed, through text segmentation, to generated a segmented version 304 of each of the reviews. The segmented version may be a list of words, phrases, pictograms, and/or other portions of the text included in the original review. Word embedding may then be applied to the segmented text 304 to generate a vectorized version 306 of the review.

To apply deep learning based techniques, the natural language texts are transformed into (e.g., well-formed) vectorized data. Such data is also referred to as doc-images. The preliminary processes include text segmentation, also known as morphological analysis or tokenization, and word embedding. With respect to vector transformation of input natural language in deep learning, implementations support any the analysis of reviews that are written using any natural language for which the text can be transformed into doc-images. A portion of text (e.g., a review or other document) is segmented into a sequence of meaningful units such as words or phrases. This can be straightforward for some languages such as English, or more complex for character-based languages such as Japanese, Chinese, and so forth. Based on a statistical model, a set of words is mapped to a set of numerical vectors. A sequence of such vectorized data of a document constitutes a 2-D image, a doc-image, of the document. The vectorized data is then used in subsequent processing to generate the model. Vectorization is also used to pre-process the unrated reviews that are provided to the model(s) for rating prediction.

Figure 4:
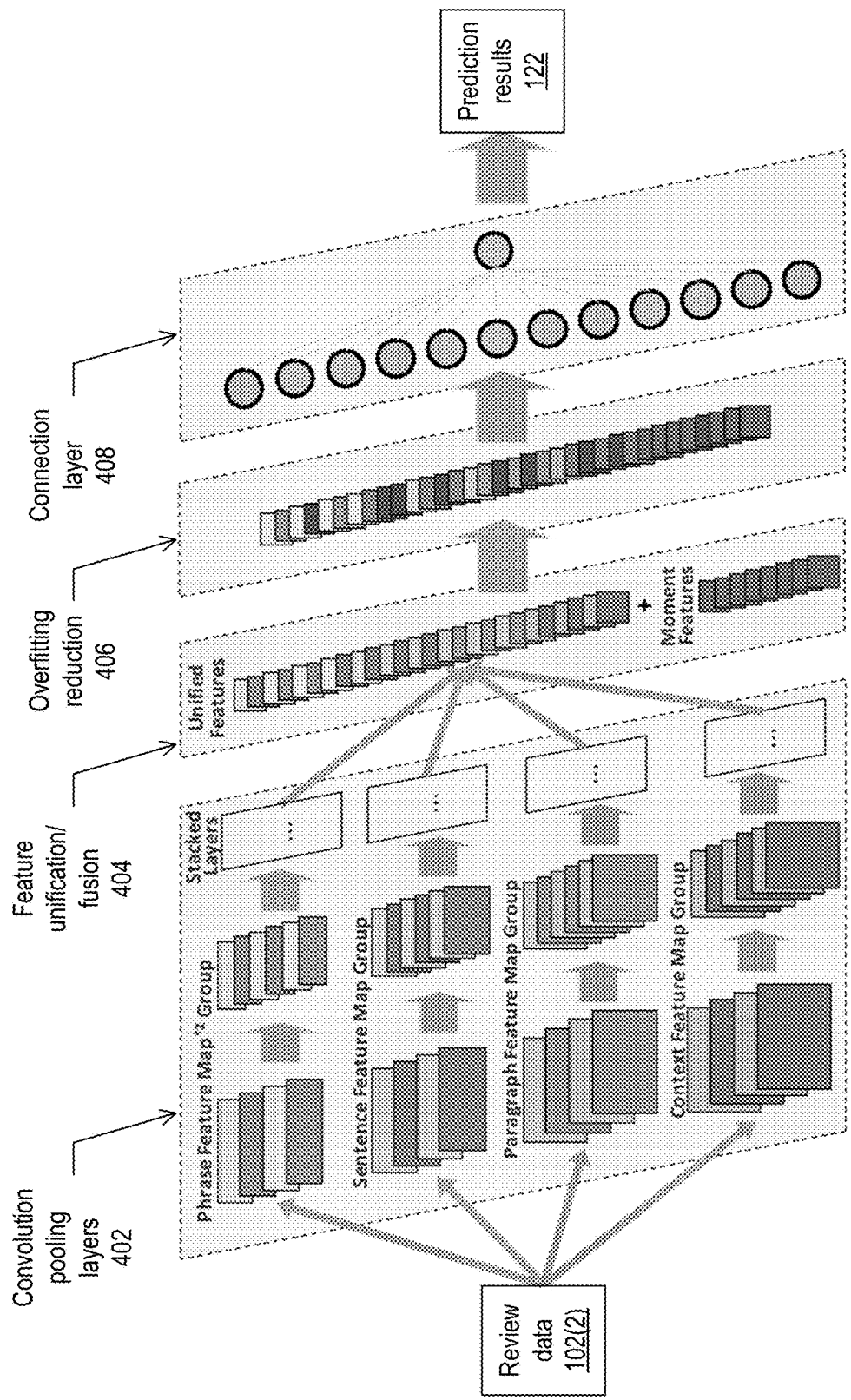
FIG. 4 depicts a schematic of an example deep convolutional neural network structure with distributed parallel model building, according to implementations of the present disclosure.

FIG. 4 depicts a schematic of an example deep CNN structure with distributed parallel model building, according to implementations of the present disclosure. As shown in the example, the structure may include convolution pooling layers 402 at varying levels of specificity. For example, the layers 402 may include a phrase feature map group, a sentence feature map group, a paragraph feature map group, and/or a context feature map group. The input review data 102(2) may be distributed to the various layers for parallel processing, to save time and/or more efficiently use computing resources. A stacked layer may be generated as output from each layer 402. Although FIG. 4 depicts an example in which four layers 402 are employed, implementations may include more or fewer layers 402 as appropriate. Accordingly, one or more stacked convolutional and/or pooling layers, with the same or different structures, can be additionally inserted into the layers 402. The convolution and/or pooling layers 402 implement the heuristic unsupervised pre-training.

The stacked layers may be combined as unified features in the next step, feature unification and/or fusion 404. Through feature unification and/or fusion 404, the unified features are combined with the user moment features, as described further below. In some implementations, the combined features are reduced through over-fitting reduction 406, and provided to a (e.g., full) connection layer 408 which is then employed to generate the prediction results 122.

Although examples herein may describe the predicted ratings as ratings on a numeric scale (e.g., one to five stars), the ratings may also be in other formats. For example, the model(s) can be used for classification (e.g., classifying pro versus con or other binary opinions), as well as for regression (e.g., predicting 5-point-ratings). Convolutional neuron layers are also called feature maps in CNN. The four different groups corresponding to the different layers of the CNN, e.g., phrase, sentence, paragraph, and context, may be used to analyze different aspects of the input text to different degrees of specificity, and to capture meaning at different levels within the text. The broader (e.g., less specific) feature maps consume a larger amount of computing resources corresponding to a larger number of neurons. For example, the context feature map layer consumes more resources than the paragraph feature map layer, and so forth.

In the over-fitting reduction step 406, one or more features may be randomly dropped out and omitted from further processing. Alternatively, focused feature reduction may be employed, in which certain features are dropped out depending on the focus of ratings. For example, the focus may be to determine ratings related to one or more particular restaurants as opposed to ratings for locations generally, so the location-related features may be dropped out. This focused feature reduction may lead to more accurate ratings related to the retained features. In general, over-fitting reduction involves a trade-off between accuracy and performance. Fewer features may provide better performance in training the model, but may generate a model that is less accurate, in at least some aspects, than the model that would otherwise be output without the reduction.

Conventional deep model building process generally involves a single sequential set of tasks. For example, in a conventional model building process, a first epoch may include a first set of mini-batches that are executed sequentially (e.g., serially), followed by a second epoch that includes a second set of mini-batches that are executed sequentially, and so forth. Each mini-batch may include steps to fetch the mini-batch data, calculate a stochastic gradient, and update the model. All the epochs as well as the mini-batches contained in epochs traditionally run on one node, creating a substantial load on the node doing the processing, and leading to a lack of scalability.

Figure 5:
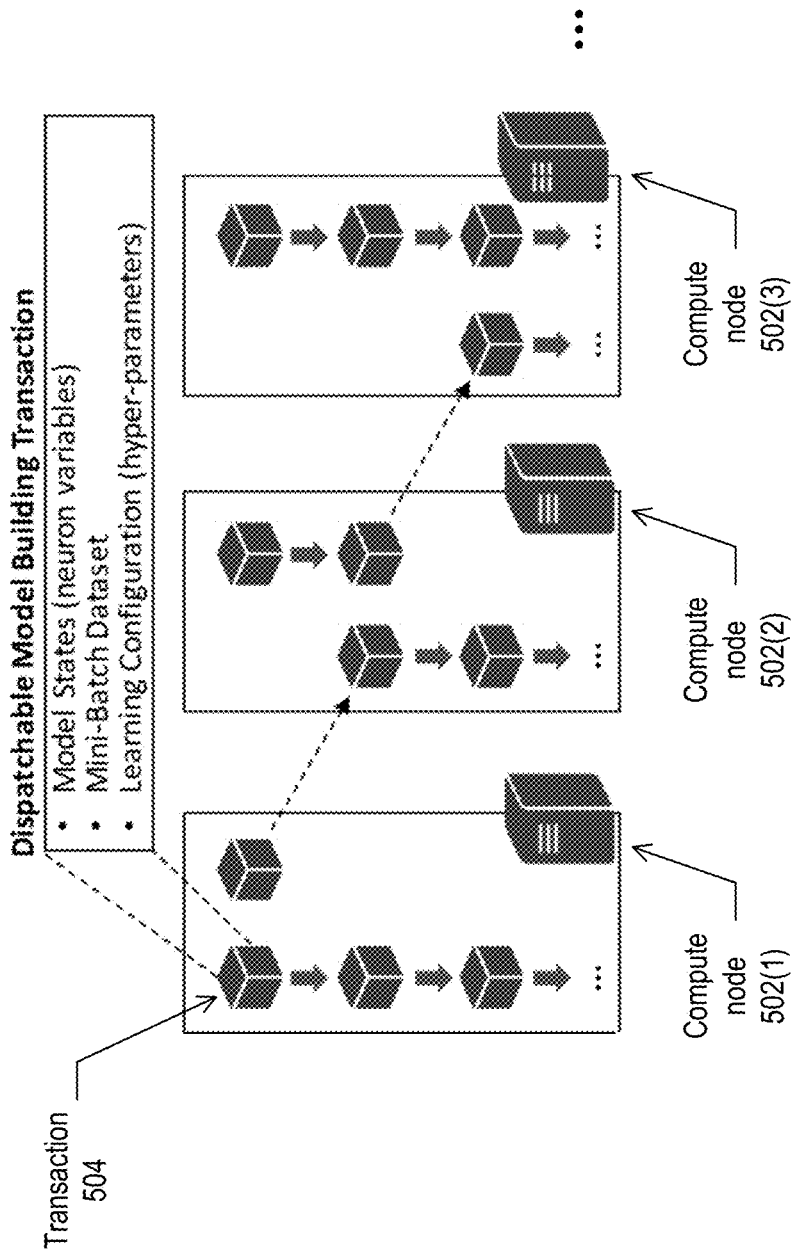
FIG. 5 depicts a schematic illustrating an example of distributed parallel model building, according to implementations of the present disclosure.

FIG. 5 depicts a schematic illustrating an example of distributed parallel model building, according to implementations of the present disclosure. In the example of FIG. 5, any suitable number of compute nodes 502 are employed for parallel model building. Each node 502 may execute any suitable number of transactions 504, each being a dispatchable model building transaction. The transactions 504 may include model states (e.g., neuron variables), mini-batch datasets, learning configurations (e.g., hyper-parameters), and so forth. In scenarios where markets are highly segmented, segment-specific models are used. Implementations employ a distributed parallel model building paradigm that can train multiple deep CNN models simultaneously with high scalability, such that a large number of segment-specific models, and/or models for the same training purpose but with different hyper-parameter-settings (e.g., those trained by grid-search methods), may be trained in parallel at the same time. The distributed parallel model building paradigm is highly scalable, and its capacity for model building can be dynamic adjusted by configuring the number of compute nodes 502 that are used.

In the implementations described herein, distributed parallel model building allows the training processes to be divided into dispatchable building transactions 504, which can be distributed among the nodes 502 for parallel processing and load balancing among the nodes 502. The model building tasks for a particular model is divided into discrete model building transactions for parallelization among the nodes. The multiple nodes are also used to train different models, in parallel, at the same time. A scheduler may be employed to shift the various transactions among the nodes to balance the load and to optimize the parallelism. For example, if it is determined that the load on a particular node has reached or surpassed a threshold processing load, suitable transactions may be moved to other node(s) to reduce the load on the more heavily used node. In some instances, one or more training tasks might stop earlier than expected (e.g., earlier than a planned completion time) when the training scores are above or below the thresholds set. In some instances, the scheduler can (e.g., immediately) detect such early stop situations and schedule other model building transactions to the nodes on which the early stopped tasks were running, as an additional technique for optimizing the use of available computation resources.

Figure 6:
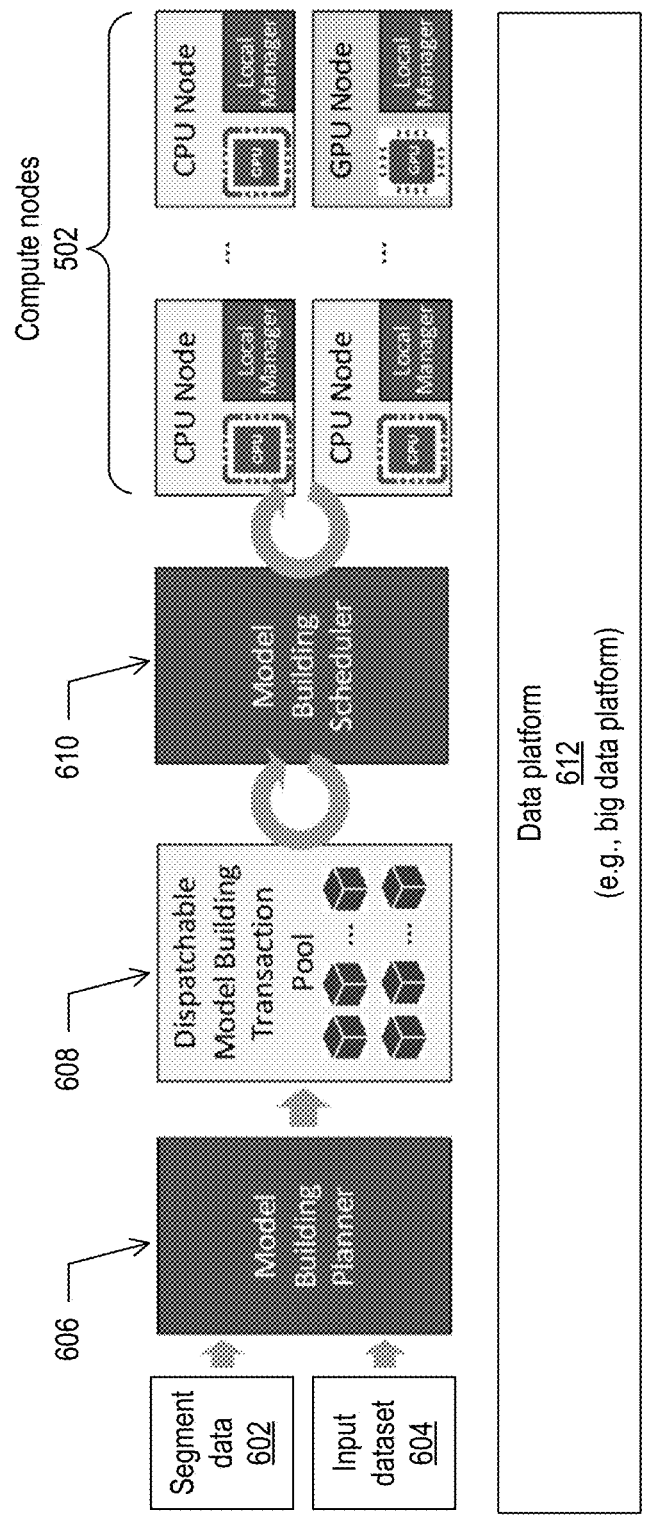
FIG. 6 depicts an example system for distributed parallel model building, according to implementations of the present disclosure.

FIG. 6 depicts an example system for distributed parallel model building, according to implementations of the present disclosure. In some implementations, the distributed parallel model building system includes a model building planner 606 that creates dispatchable transaction packages, and a model building scheduler 610 that dynamically coordinates the training progress among the compute nodes 502. Each node 502 executes a local manager that monitors and controls the local training process on that node 502. The modules 608 and 610, and the nodes 502, execute on a data platform 612 (e.g., a big data platform and/or cloud computing environment) that support parallel operations.

The planner 606 receives segment data 602 and an input dataset 604, and prepares the dispatchable transactions in a dispatchable model building transaction pool 608. The dispatchable transaction may be prepared based on the dataset 604 and/or the (e.g., market) segment data 602. For example, a maximum parallel level is NM, while the maximum number of schedulable transactions, which are the entities with the finest granularity managed by the Model Building Scheduler 610, is NM×NE×NMB, where NM is the number of models to train, NE is the number of epochs for one training task, and NMB is the number of mini-batches of one epoch. The scheduler 610 retrieves the transactions from the pool 608, and schedules the execution of the transactions on the various nodes 502. In some implementations, the scheduler 610 balances the build load among the computation nodes 502, to maximize efficiency in the parallel model building process. Each local manager, on each node 502, can monitor the status and communicate with the scheduler 610, to indicate a current load and/or unused processing capacity of each node 502. In some implementations, the nodes 502 can include CPU and/or GPU computer instances, each with appropriate memory area to cache the training transaction packages, which are used in the model building process.

In some implementations, a training paradigm is employed in which the entire training dataset, together with the model states and learning configuration, can be divided into multiple dispatchable model building transactions to enable the distributed parallel model building. The model building planner 606, model building scheduler 610, and local managers of the nodes 502 coordinate among themselves to optimize the work load among all the computation nodes, and therefore shorten the training time needed to build the model(s).

Figure 7:
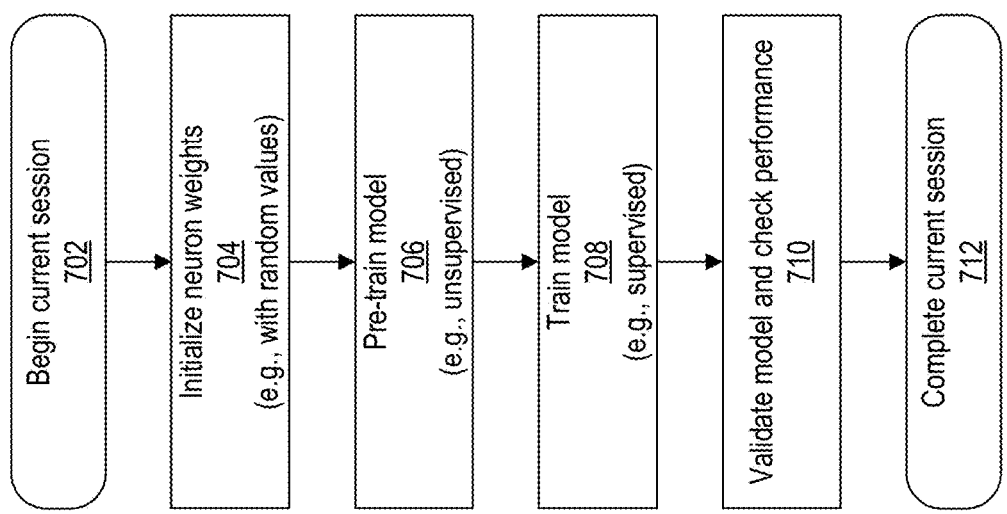
FIG. 7 depicts a flow diagram of an example process for training a model, according to implementations of the present disclosure.

FIG. 7 depicts a flow diagram of an example process for training a model, according to implementations of the present disclosure. Operations of the process can be performed by the prediction engine 110, model building module(s) 112, data interface(s) 106, and/or other software module(s) executing on the server computing device(s) 104 or elsewhere.

A current training session begins (702) to train a model, and neuron weights are initialized (704). In some implementations, the neuron weights are initialized with random values. The model is pre-trained (706) using unsupervised training. The model is then trained (708) using supervised training. The model is validated (710) and its performance is checked. The current training session may then end (712).

One of the challenges in deep learning is how to efficiently find the global optima of the neurons' weights. In the implementations described herein, a heuristic unsupervised pre-training scheme is incorporated into the training process to address this issue. Conventional training processes may train a deep CNN model using supervised training, and may repeat the training many times to attempt to find the optima. By incorporating a heuristic unsupervised pre-training step into the training process, implementations capture important features that enable the training to proceed more efficiently without the iterations used in conventional processes.

Figure 8:
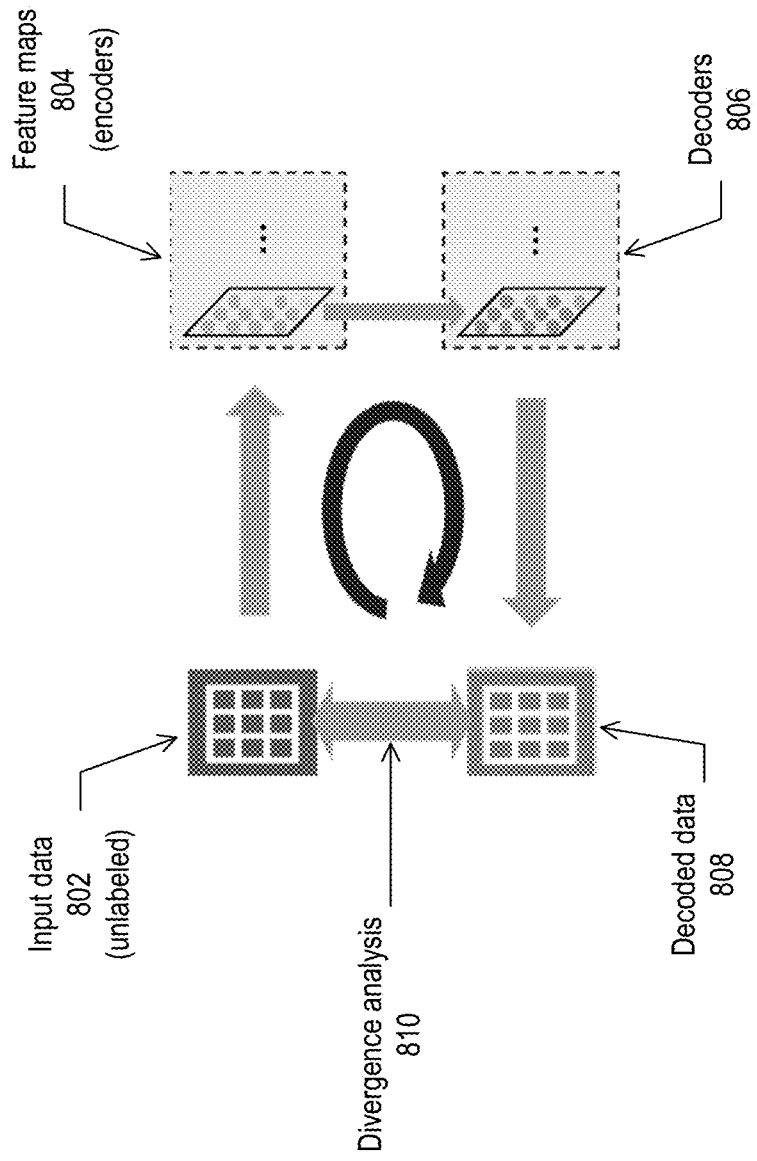
FIG. 8 depicts a schematic of an example unsupervised pre-training process, according to implementations of the present disclosure.

FIG. 8 depicts a schematic of an example unsupervised pre-training process, according to implementations of the present disclosure. The process of FIG. 8 may execute as part of the process of FIG. 7 (e.g., step 706), and may operate to retain the important features of the input text being analyzed. The input data 802 (e.g., unlabeled data, without rating information) may be transformed to a set of vectors as described above, and processed by the encoders to determine feature maps 804. The encoded features maps may then be provided to decoders 806 and, based on the vectors, decoded data 808 is generated. A divergence analysis 810 may be performed to compare the original input data 802 to the restored text of the decoded data 808. If the divergence (e.g., difference) between the two is low, below a predetermined threshold value of a divergence cost function as described below, then a determination is made that the important features have been captured through the pre-training process. If not, a different vectorization can be attempted and the process may repeat. The process may iterate in this fashion until the divergence cost function is below threshold.

As shown in FIG. 8, implementations employ a stacked encoder-decoder approach to perform unsupervised pre-training, to force the feature maps to learn the important features from the unlabeled data. One auxiliary decoder neuron layer is created for each neuron layer of the model. The divergence between the input and the decoded data is used to guide the pre-training process. A heuristic cost function captures both absolute difference (e.g., mean squared error (MSE)) and distribution difference (e.g., Kullback-Leibler (KL) divergence). For a multilayer CNN, the pre-training is done in layer-wise (stacked) fashion. The next layer is to be pre-trained just after the pre-training of the previous layer. Example Formula 1, below, provides an example of an encoding function that employs forward convolution, which may be employed. Example Formula 2, below, provides an example of a decoding function that employs reverse convolution, which may be employed. Example Formula 3, below, provides an example of a heuristic cost function, which may be employed to provide a measure of the divergence. The hyper-parameters (α, θ) of the heuristic cost function help to fine-tune this process.

Example Formula 1—Encoding Function (Forward Convolution)

$$y_{ij}^k = \sigma\left(\sum_{ij} w_{ij} x_{ij} + b\right)$$

Example Formula 2—Decoding Function (Reverse Convolution)

$$\tilde{z}_{ij}^k = \sigma\left(\sum_{ij} \tilde{w}_{ij} y_{ij} + \tilde{b}\right)$$

Example Formula 3—Heuristic Cost Function $$f_{divergence} = \alpha\left[\theta\left(\frac{1}{n}\sum_{ij} \|z_{ij} - x_{ij}\|\right) + (1-\theta)\left(\sum_T p_x(t)\log\frac{p_x(t)}{p_z(t)}\right)\right]$$

The heuristic cost function captures both the absolute difference and the distribution difference, to better guide the model to learn important features from the un-labeled input data. Hyper-parameters, including scale weight α and balance weight θ, help to adjust the cost function for applications that use input data from different domains.

Figure 9:
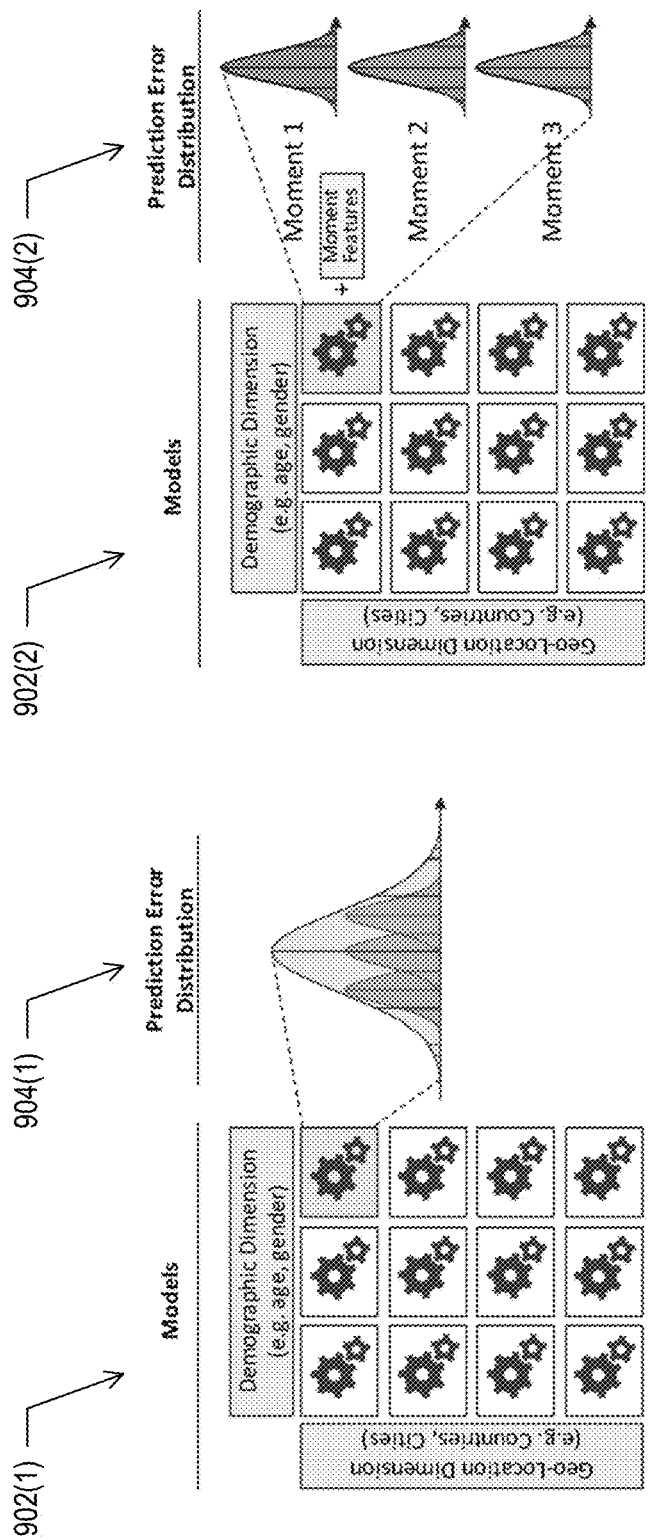
FIGS. 9A and 9B depict schematics of prediction error distribution, respectively without and with user moment feature fusion, according to implementations of the present disclosure.

FIGS. 9A and 9B depict schematics of prediction error distribution, respectively without and with user moment feature fusion, according to implementations of the present disclosure. In some implementations, the predicted ratings also depend on a particular status and/or context of the user, which is referred to as the user moment. A user moment may include one or more features that indicate user characteristics, such as the type of action the user wants to engage in (e.g., tourism, eating at restaurants, etc.), interests of a user, and so forth. The user moment information can be determined through other channels, such as recent search terms, user purchase information, web browsing activities, and so forth. Incorporating user moment information into the prediction process can further improve the prediction accuracy. Variables of the user moment information are categorical, and the flexibility of the structure of the CNN makes it possible to readily incorporate such information into the analysis.

In the examples shown, the model space is arranged into a 4 by 3 matrix of segments, where a model is to be built for each segment (e.g., each cell in the example matrix). FIG. 9A depicts an example in which user moment information is not employed. Because the error distributions corresponding to different moments are mixed in the final results, the final prediction errors are distributed over a wide range. As shown in the example of FIG. 9B, using moment information can narrow the range of the error distribution.

Figure 10:
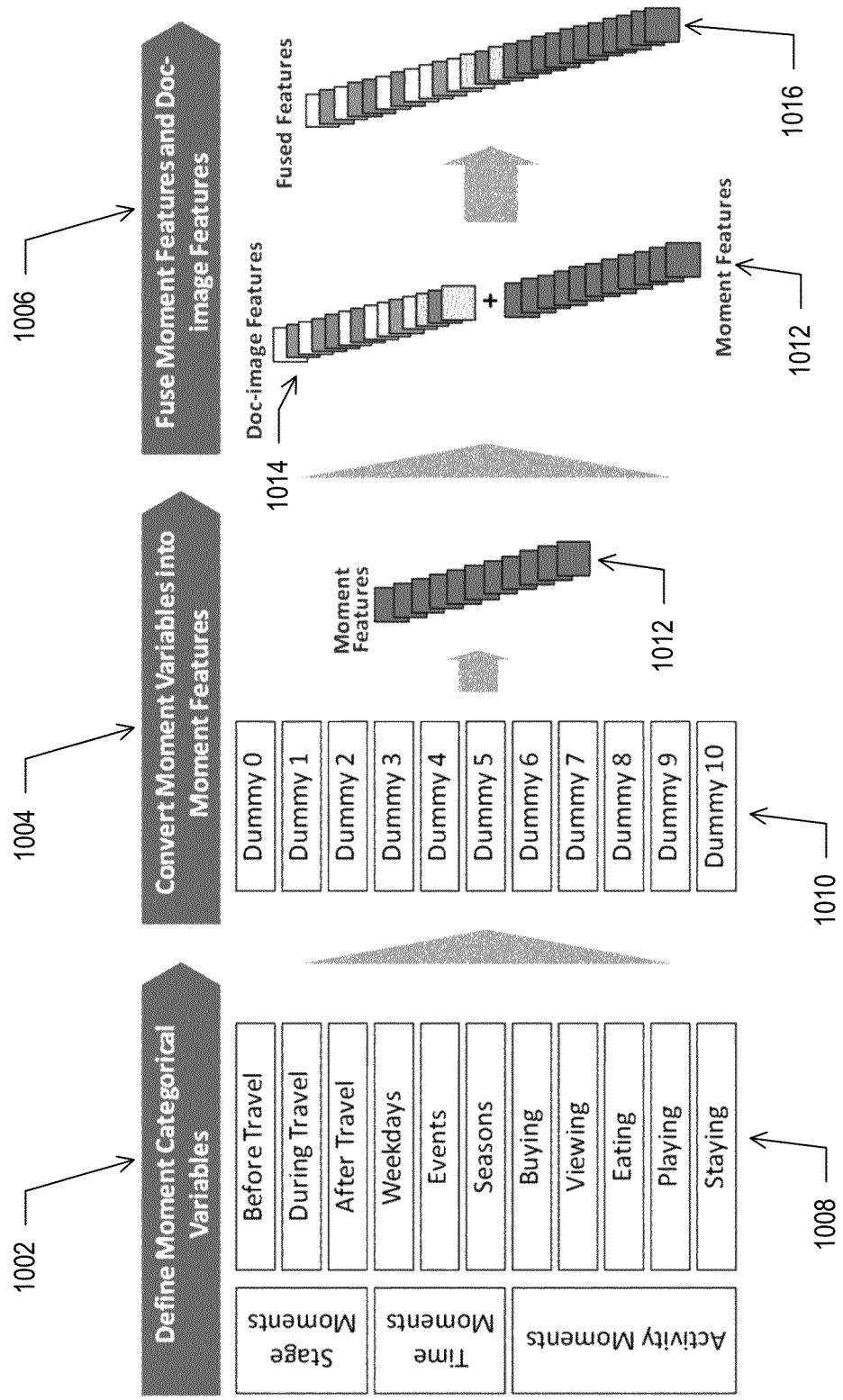
FIG. 10 depicts a diagram of an example process for user moment feature fusion, according to implementations of the present disclosure.

FIG. 10 depicts a diagram of an example process for user moment feature fusion, according to implementations of the present disclosure. Any suitable number of moment categorical variables 1008 may be defined (1002). In the example shown, the variables are grouped into categorical variables describing a stage of travel, time moments, and activity moments. The moment variables are converted (1004) into moment features 1012, by way of one or more dummy variables 1010. The moment features 1012 may then be fused (1006) (e.g., combined) with doc-image features 1014 to generate a fused set of features 1016, which may be employed for subsequent processing.

User moments can be defined on the basis of domain knowledge and/or practices. For example, in an inbound marketing scenario, three moment categories are defined: stage moments, time moments, and activity moments. The user moment information is first mapped to a set of categorical variables, and the converter module converts the categorical moment variables into dummy numbers. The dummy moment variables are organized as an additional vector, which is fused with unified features converted from the doc-image data. To further improve prediction accuracy, domain-specific information and practices are combined with deep learning based model building, in which user moment information can be fused into the deep CNN model.

Figure 11:
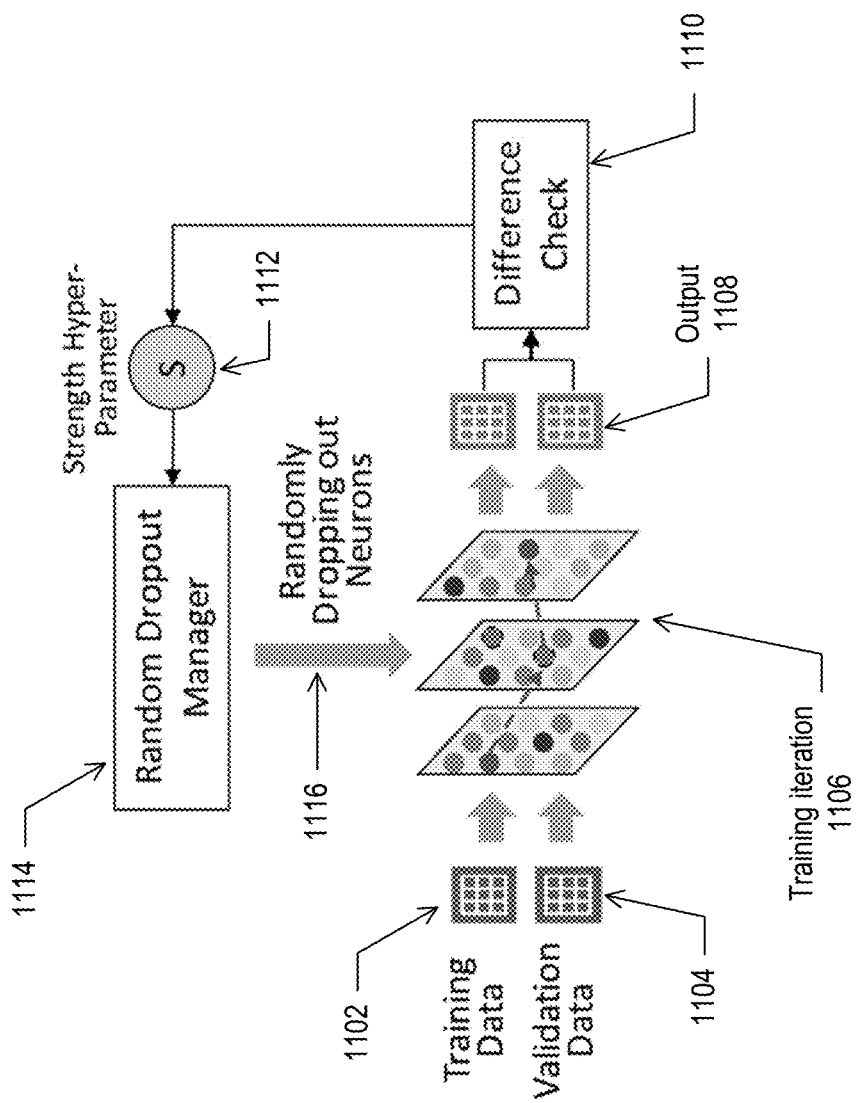
FIG. 11 depicts a diagram of an example process for adaptive over-fitting reduction, according to implementations of the present disclosure.

FIG. 11 depicts a diagram of an example process for adaptive over-fitting reduction, according to implementations of the present disclosure. In some implementations, an adaptive (e.g., random) dropout mechanism is employed to reduce the over-fitting that can be present in the training process. Over-fitting occurs when the model wrongly learns noise and/or trivial information, rather than learning more useful information. Deep learning applications may be particularly susceptible to over-fitting, given that the number of neurons is typically very large (e.g. millions).

By applying a dropout mechanism, over-fitting is substantially reduced even when using a relatively small set of training data. However, the learning ability of the CNN model is also weakened at some degree, as a tradeoff effect. An adaptive scheme is employed to dynamically adjust the strength of the (e.g., random) dropout, such that the tuning effort is reduced. When the training dataset is too small, iterative multi-epoch-training may cause hard links among some particular neurons that can only learn trivial information. The (e.g., random) dropout mechanism invalidates (e.g., removes) a portion of the neurons, according to some ratio, at each training step. Consequently, the hard links may be cut and over-fitting is reduced.

Both a training cost and a validation cost may be computed simultaneously after each training step, and the difference between the two costs may be used as an indicator of over-fitting. A larger difference indicates that the model has a high risk of over-fitting. A hyper-parameter controls the strength of the random dropout. If the detected over-fitting level is high, then the strength is increased. Otherwise, the strength may be kept at the same value or be decreased. Example Formula 4, below, may be used to calculate the training versus validation difference:

Example Formula 4—Training-Validation Difference $$d_{T-V} = |cost_{training} - cost_{validation}|$$

Example Formula 5, below, may be used to calculate the Strength hyper-parameter.

Example Formula 5—Strength Adaption $$S = a_0 + a_1 d_{T-V} + a_2 d'_{T-V}$$

In Example Formula 5, a0, a1, a2 are coefficients of bias, difference, and the rate of change of the difference, respectively. Example Formula 6, below, may be used to determine the dropout, for example in instance where the dropout is random.

Example Formula 6—Random Dropout Mask $$M \sim P(S)$$

In Example Formula 6, P(S) is a random kernel function, such as a Bernoulli distribution B(1, S). Example Formula 7, below, may be used to perform a dropout operation.

Example Formula 7—Dropout Operation $$\widehat{x_{ij}} = x_{ij} * M_{ij}$$

In some implementations, the dropout mask is applied to the feature maps. The bits of the mask with the value zero indicate the dropout of those neurons at the corresponding positions. The dynamic dropout mechanism is employed to reduce over-fitting. The strength hyper-parameter is based on the measurement of difference between costs of the training data and the validation data. The underlying hyper-parameters may be used to fine-tune the strength adjustment mechanism.

As shown in the example of FIG. 11, training data 1102 and validation data 1104 may be provided as input to a training iteration 1106, which provides output 1108 that is sent to a difference check module 110. The difference check module 1110 analyzes the difference in output of the training iteration for the training data and the validation data, and determines the strength hyper-parameter 1112. A random dropout manager 1114 employs the strength hyper-parameter to randomly drop out certain neurons (1116). The process may then iterate as needed.

To track the degree of over-fitting present in the system, implementations employ a validation dataset that is substantially a mimic of the true input dataset. The input data includes validation data and true data. The strength hyper-parameter indicates how much data is to be dropped out, and may be described as a key performance indicator. In some instances, if the difference is high, S is increased. If the difference is low, S is decreased.

Figure 12:
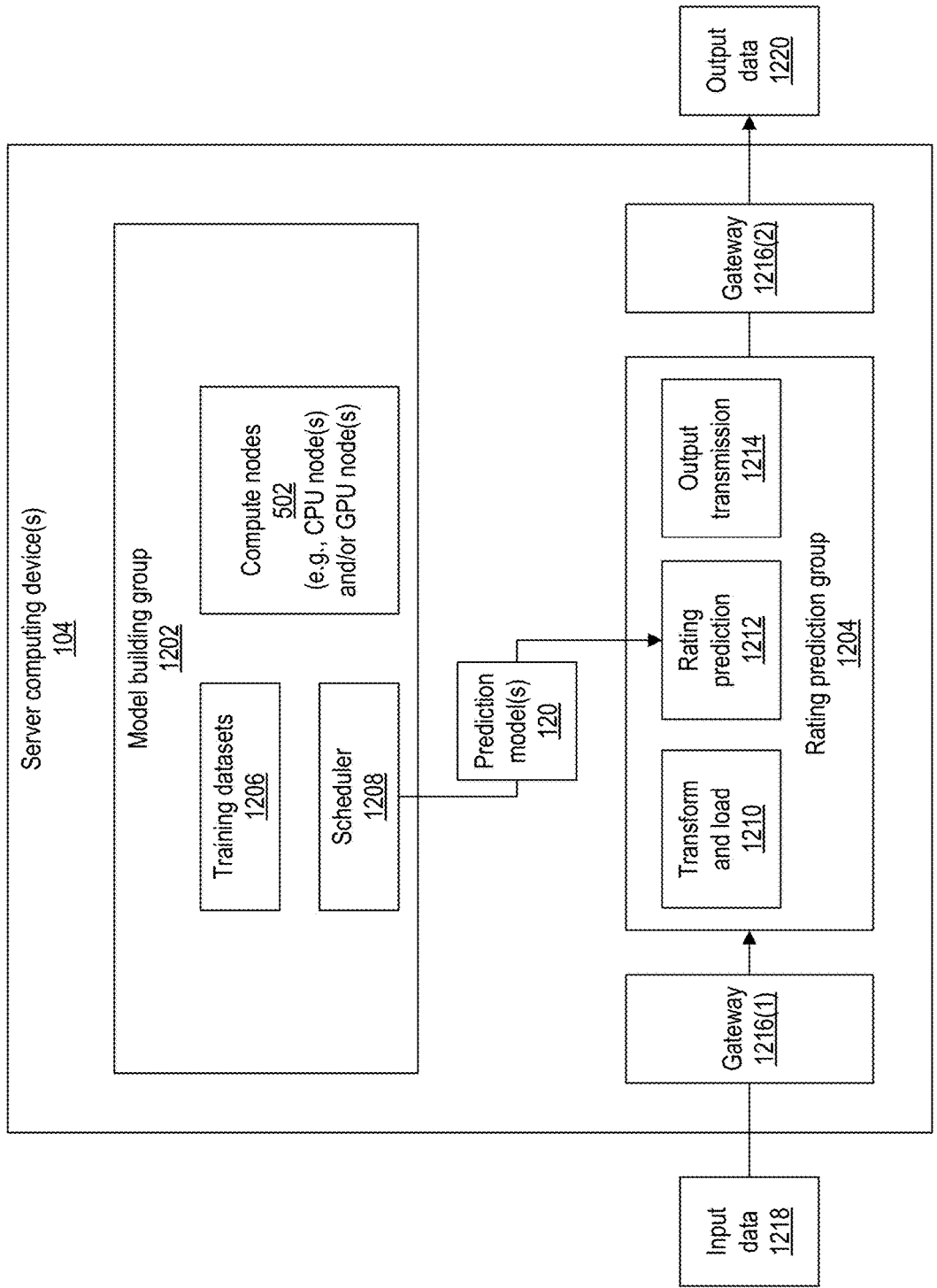
FIG. 12 depicts an example system for network rating prediction, according to implementations of the present disclosure.

FIG. 12 depicts an example system for network rating prediction, according to implementations of the present disclosure. The server computing device(s) 104 may include at least two groups of devices, a model building group 1202 and a rating prediction group 1204. The model building group 1202 includes the various compute nodes 502 described above, such as CPU and/or GPU nodes. The group 1202 may also include the training datasets 1206 and the scheduler 1208, such as the scheduler 610. The scheduler 1208 may output the model(s) 120 built through distributed parallel model building using the compute nodes 502.

The rating prediction group 1204 may include devices that perform operations for transform and load 1210, rating prediction 1212, and output transmission 1214. Input data 1218 (e.g., unrated review data 102(2)) is received, through a gateway 1216(1), and provide to transform and load 1210 components. The output of transform and load is sent to rating prediction, which employs the model(s) 120 to predict ratings for the input data 1218. The data, with the predicted ratings, is sent to output transmission 1214, which transmits output data 1220 through a gateway 1216(2) to one or more data consuming devices, processes, and/or other entities.

Figure 13:
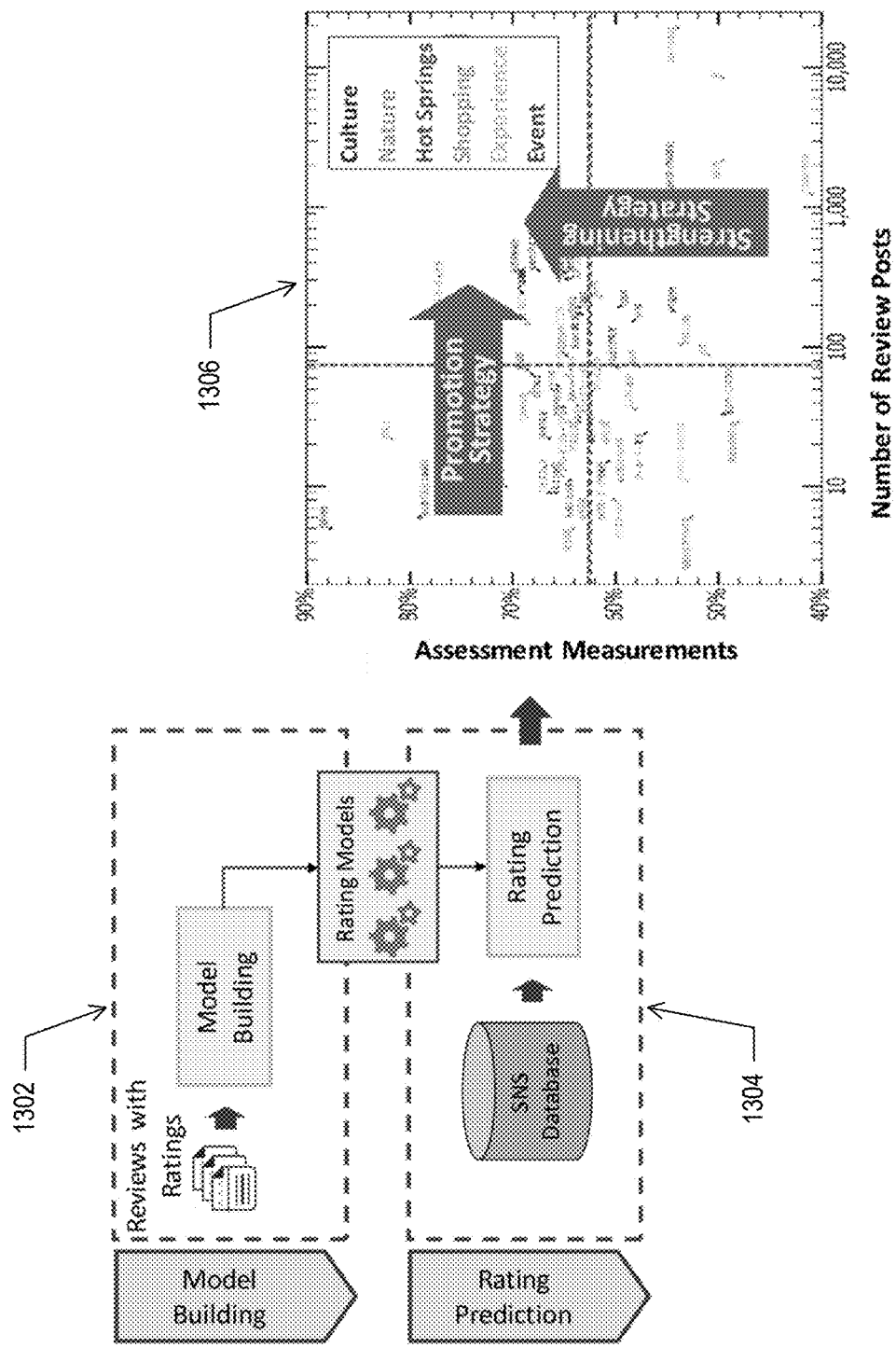
FIG. 13 depicts a diagram of an example use case for rating prediction, according to implementations of the present disclosure.

FIG. 13 depicts a diagram of an example use case for rating prediction, according to implementations of the present disclosure. As described above, model building 1302 operates to build the model(s) based on the reviews with ratings, and the model(s) are used for rating prediction 1304 in which previously unrated reviews are associated with predicted ratings. The reviews with rating predictions may then be used for any suitable purpose. In the example shown, the predictions are used to more accurately direct promotion strategy and/or strengthening strategy related to various categories such as culture, nature, shopping, events, and so forth.

Figure 14:
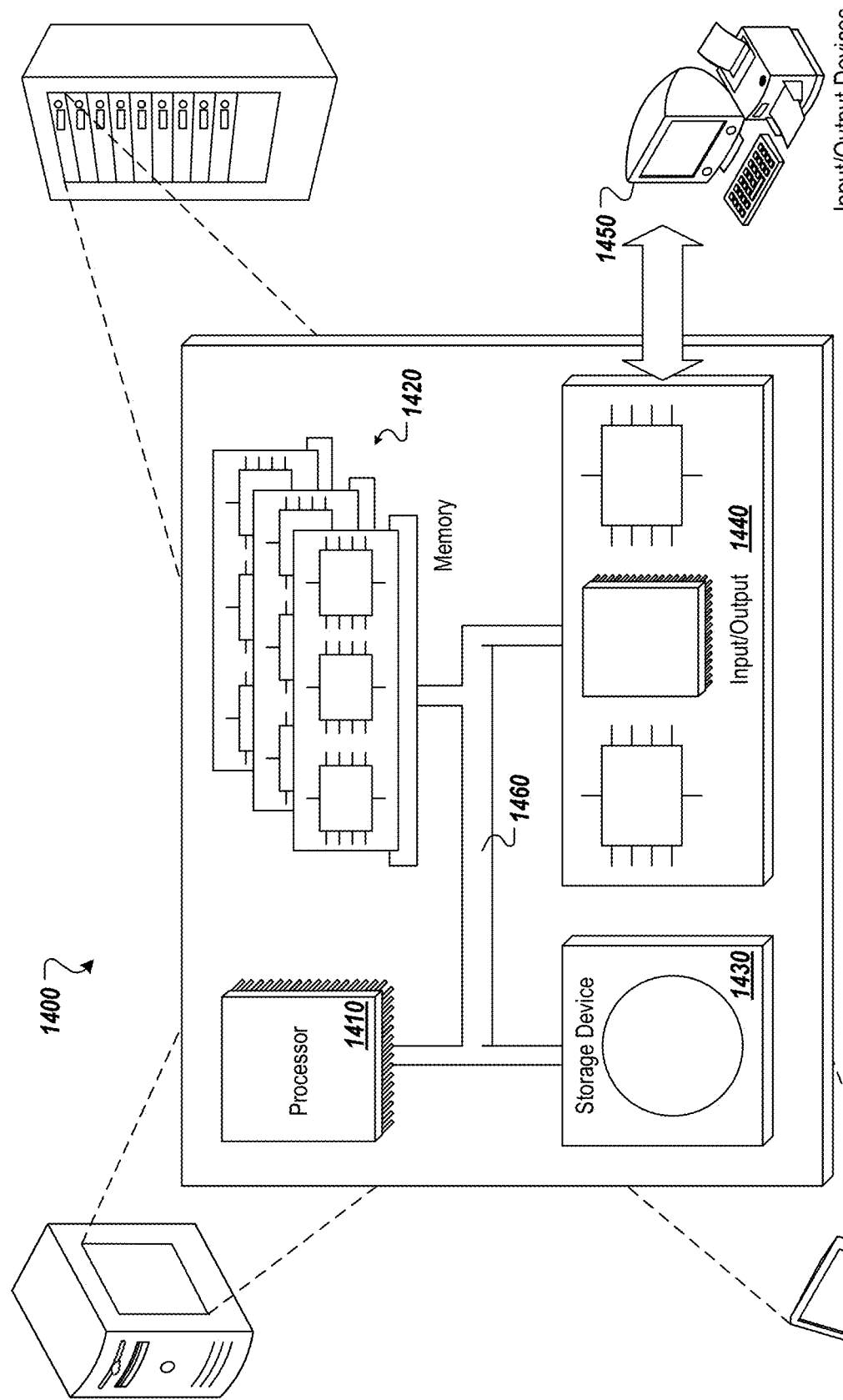
FIG. 14 depicts an example computing system, according to implementations of the present disclosure.

FIG. 14 depicts an example computing system, according to implementations of the present disclosure. The system 1400 may be used for any of the operations described with respect to the various implementations discussed herein. For example, the system 1400 may be included, at least in part, in the various computing device(s) and/or computing system(s) described herein, such as the server computing device(s) 104, the prediction output device(s) 124, the compute node(s) 502, and/or the data platform 612. The system 1400 may include one or more processors 1410, a memory 1420, one or more storage devices 1430, and one or more input/output (I/O) devices 1450 controllable through one or more I/O interfaces 1440. The various components 1410, 1420, 1430, 1440, or 1450 may be interconnected through at least one system bus 1460, which may enable the transfer of data between the various modules and components of the system 1400.

The processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. The processor(s) 1410 may include hardware-based processor(s) each including one or more cores. The processor(s) 1410 may include general purpose processor(s), special purpose processor(s), or both.

The memory 1420 may store information within the system 1400. In some implementations, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In some examples, the memory 1420 may be employed as active or physical memory by one or more executing software modules.

The storage device(s) 1430 may be configured to provide (e.g., persistent) mass storage for the system 1400. In some implementations, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In some implementations, the CRSM may include a data store that provides storage of computer-readable instructions or other information in a non-transitory format. The CRSM may be incorporated into the system 1400 or may be external with respect to the system 1400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1410 and the memory 1420 may be supplemented by, or incorporated into, one or more application-specific integrated circuits (ASICs).

The system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1400, or may be external with respect to one or more computing devices of the system 1400.

The system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-232 standard for serial ports, or with a version of the IEEE 1284 standard for parallel ports. As another example, the I/O interface(s) 1440 may be configured to provide a connection over Universal Serial Bus (USB) or Ethernet. In some examples, the I/O interface(s) 1440 may be configured to provide a serial connection that is compliant with a version of the IEEE 1394 standard.

The I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more networks using any network protocol.

Computing devices of the system 1400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input. In some instances, input and/or output may be received and/or provided through an augmented reality and/or virtual reality system.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, first review data that includes a plurality of rated reviews;
   determining, by the at least one processor, a plurality of model building transactions to be executed to build at least one prediction model based on the first review data;
   building, by the at least one processor, the at least one prediction model through use of at least one deep convolutional neural network (CNN), including distributing the plurality of model building transactions for parallel execution on a plurality of compute nodes, the building comprising a heuristic unsupervised pre-training that employs a heuristic formula that includes an absolute difference factor and a distribution difference factor;
   receiving, by the at least one processor, second review data that includes a plurality of unrated reviews; and
   predicting, by the at least one processor, a rating for each of the plurality of unrated reviews using the at least one prediction model.

2. The method of claim 1, wherein:
   the plurality of model building transactions are distributed, through a scheduler, based on load information for the plurality of compute nodes; and the load information is received by the scheduler from a plurality of training managers each executing on a respective compute node.

3. The method of claim 1, wherein the building of the at least one prediction model includes a user moment feature fusion to provide a plurality of unified features by combining a plurality of user moment features with a plurality of features that are output from the at least one deep CNN.

4. The method of claim 3, wherein the building of the at least one prediction model includes an adaptive over-fitting reduction to reduce the plurality of unified features.

5. The method of claim 4, wherein the adaptive over-fitting reduction includes, in one or more iterations:
randomly dropping out a subset of the unified features; and
determining a strength parameter based on a difference between outputs of a training iteration applied to training data and validation data, wherein the strength parameter indicates an amount of random dropout in a next iteration.

6. The method of claim 1, wherein the at least one deep CNN includes a plurality of convolution layers of varying scope.

7. The method of claim 6, wherein the plurality of convolution layers includes layers that correspond to a phrase feature map group, a sentence feature map group, a paragraph feature map group, and a context feature map group.

8. A system comprising:
at least one processor; and
a memory communicatively coupled to the at least one processor, the memory storing instructions which, when executed by the at least one processor, instruct the at least one processor to perform operations comprising:
receiving first review data that includes a plurality of rated reviews;
determining a plurality of model building transactions to be executed to build at least one prediction model based on the first review data;
building the at least one prediction model through use of at least one deep convolutional neural network (CNN), including distributing the plurality of model building transactions for parallel execution on a plurality of compute nodes, the building comprising a heuristic unsupervised pre-training that employs a heuristic formula that includes an absolute difference factor and a distribution difference factor;
receiving second review data that includes a plurality of unrated reviews; and
predicting a rating for each of the plurality of unrated reviews using the at least one prediction model.

9. The system of claim 8, wherein:
the plurality of model building transactions are distributed, through a scheduler, based on load information for the plurality of compute nodes; and
the load information is received by the scheduler from a plurality of training managers each executing on a respective compute node.

10. The system of claim 8, wherein the building of the at least one prediction model includes a user moment feature fusion to provide a plurality of unified features by combining a plurality of user moment features with a plurality of features that are output from the at least one deep CNN.

11. The system of claim 10, wherein the building of the at least one prediction model includes an adaptive over-fitting reduction to reduce the plurality of unified features.

12. The system of claim 11, wherein the adaptive over-fitting reduction includes, in one or more iterations:
randomly dropping out a subset of the unified features; and
determining a strength parameter based on a difference between outputs of a training iteration applied to training data and validation data, wherein the strength parameter indicates an amount of random dropout in a next iteration.

13. The system of claim 8, wherein the at least one deep CNN includes a plurality of convolution layers of varying scope.

14. The system of claim 13, wherein the plurality of convolution layers includes layers that correspond to a phrase feature map group, a sentence feature map group, a paragraph feature map group, and a context feature map group.

15. One or more non-transitory computer-readable storage media storing instructions which, when executed by at least one processor, instruct the at least one processor to perform operations comprising:
receiving first review data that includes a plurality of rated reviews;
determining a plurality of model building transactions to be executed to build at least one prediction model based on the first review data;
building the at least one prediction model through use of at least one deep convolutional neural network (CNN), including distributing the plurality of model building transactions for parallel execution on a plurality of compute nodes, the building comprising a heuristic unsupervised pre-training that employs a heuristic formula that includes an absolute difference factor and a distribution difference factor;
receiving second review data that includes a plurality of unrated reviews; and
predicting a rating for each of the plurality of unrated reviews using the at least one prediction model.

16. The one or more non-transitory computer-readable storage media of claim 15, wherein:
the plurality of model building transactions are distributed, through a scheduler, based on load information for the plurality of compute nodes; and
the load information is received by the scheduler from a plurality of training managers each executing on a respective compute node.

17. The one or more non-transitory computer-readable storage media of claim 15, wherein the building of the at least one prediction model includes a user moment feature fusion to provide a plurality of unified features by combining a plurality of user moment features with a plurality of features that are output from the at least one deep CNN.

* * * * *